(12) United States Patent
Martin et al.

(10) Patent No.: US 8,195,977 B2
(45) Date of Patent: Jun. 5, 2012

(54) NETWORK FAULT ISOLATION

(75) Inventors: Daniel Joseph Martin, Pawling, NY (US); Matthew Edward Duggan, Chertsey (GB)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/942,068

(22) Filed: Nov. 19, 2007

(65) Prior Publication Data

US 2009/0132862 A1    May 21, 2009

(51) Int. Cl.
*G06F 11/00* (2006.01)
(52) U.S. Cl. ......................................................... 714/4.1
(58) Field of Classification Search .................. None
See application file for complete search history.

(56) References Cited

U.S. PATENT DOCUMENTS

| | | | |
|---|---|---|---|
| 5,241,534 A | 8/1993 | Omuro et al. | |
| 6,581,166 B1 | 6/2003 | Hirst et al. | |
| 6,763,380 B1 | 7/2004 | Mayton et al. | |
| 6,857,094 B2 | 2/2005 | Shigeta | |
| 2002/0073231 A1 | 6/2002 | Quarterman et al. | |
| 2003/0185148 A1 | 10/2003 | Shinomiya et al. | |
| 2004/0199627 A1 | 10/2004 | Frietsch | |
| 2005/0050398 A1 | 3/2005 | Rao et al. | |
| 2005/0099955 A1 | 5/2005 | Mohan et al. | |
| 2005/0216805 A1 | 9/2005 | Guettaf | |
| 2008/0205292 A1* | 8/2008 | Denby et al. | 370/254 |
| 2008/0212484 A1* | 9/2008 | Kaminsky et al. | 370/248 |
| 2009/0086741 A1* | 4/2009 | Zhang et al. | 370/401 |

\* cited by examiner

*Primary Examiner* — Michael Maskulinski
(74) *Attorney, Agent, or Firm* — Yee & Associates, P.C.; Jeffrey S. LaBaw (57) ABSTRACT

A computer implemented method, apparatus, and computer usable program code for network fault isolation. A plurality of real-time path traces is performed between the sender and the receiver to form a plurality of trace paths in response to receiving a request for the network fault isolation between a sender and a receiver. A determination is made as to whether an asymmetry is present between the sender and the receiver from the plurality of trace paths. A set of routers is identified with each trace path in the plurality of trace paths to form a plurality of identified routers. Each event stored is identified for the plurality of identified routers to form a set of identified events.

24 Claims, 4 Drawing Sheets

NETWORK FAULT ISOLATION

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer usable program code for isolating network faults.

2. Description of the Related Art

The Internet is a global network of computers and networks joined together by gateways that handle data transfer and the conversion of messages from a protocol of the sending network to a protocol of the receiving network. On the Internet, any computer may communicate with any other computer with information traveling over the Internet through a variety of languages, also referred to as protocols. The Internet has revolutionized communications and commerce, as well as being a source of information and entertainment. Many organizations such as businesses, universities, and governments use the Internet to transact business, as well as communicate with each other.

Various enterprise and service provider networks may be connected to the Internet to provide services to clients both inside and outside the organizations providing the services. Many different metrics may be used to gauge the level or quality of service provided by these types of networks. One metric includes, for example, the speed at which data may be transferred between different points within a network. When a slow down in data transfer happens, it is often difficult to isolate the particular cause of the problem. The potential cause may be, for example, applications, middleware servers, network, storage, clients, configuration, and third-party attacks.

Currently, the fastest way to isolate a fault or cause of a slow down to a particular component or path involves actively testing some part of the component set with active probes. These tests may perform ad hoc data retrieval and/or historical data retrieval. The testing may include identifying port error rates over a last five minutes and search for threshold crossing alarms. These alarms may indicate abnormal behaviors. This information and other types of information may be used to isolate the cause or fault resulting in the slow down in the transfer of data or providing of services.

Difficulties exist with these current techniques. To place probes effectively typically requires prior knowledge of the components and the relation to each other. If the relationship between different components changes how the probes perform or act, the location of these probes may have to be replanned. Further, these types of changes between relationships also may require replanning of ad hoc data retrieval and analysis of historical data. Further, this type of process can be expensive to learn, administer, and use.

Another alternative involves receiving reports from customers or users about the degradation of service. Handling these types of calls and verifying the actual presence of a degradation in service also is expensive. Once a degradation of service has been verified, the issue may be resolved by signing the issue to a particular group of specialists. In some cases, multiple groups may be assigned to the issue, depending on the types of components handled by the different groups. For example, one group may be an application group while a second group is a hardware or network group. Both of these groups may review the issue in an attempt to isolate the problem. As a result, much time and effort is required to handle slow downs or service degradation problems.

Thus, it would be advantageous to have an improved computer implemented method, apparatus, and computer usable program product for solving the problems discussed above.

SUMMARY OF THE INVENTION

The illustrative embodiments provide a computer implemented method, apparatus, and computer usable program code for network fault isolation. A plurality of real-time path traces is performed between the sender and the receiver to form a plurality of trace paths in response to receiving a request for the network fault isolation between a sender and a receiver. A determination is made as to whether an asymmetry is present between the sender and the receiver from the plurality of trace paths. A set of routers is identified with each trace path in the plurality of trace paths to form a plurality of identified routers. Each event stored is identified for the plurality of identified routers to form a set of identified events.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
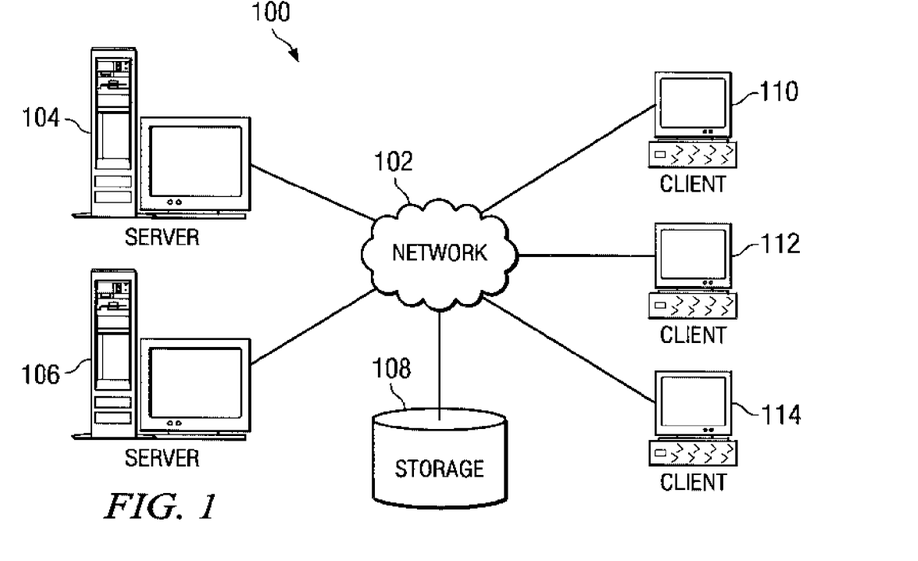
FIG. 1 is a pictorial representation of a network of data processing systems in which illustrative embodiments may be implemented.
Figure 2:
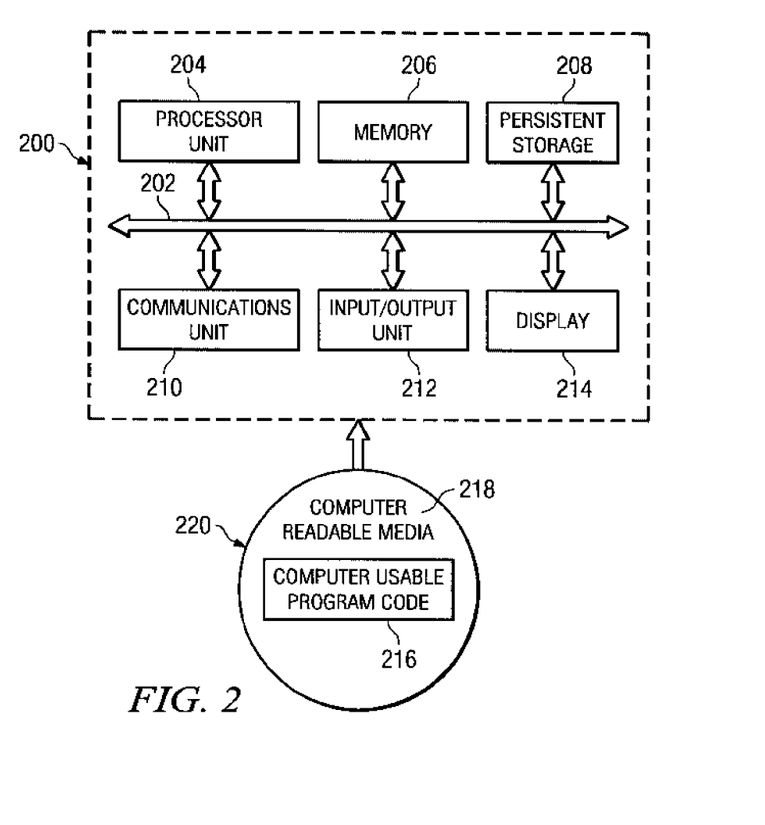
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or nonvolatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

For example, program code are stored in a computer readable storage media in a data processing system and wherein the program code may be downloaded over a network from a remote data processing system. Also the program code are stored in a computer readable storage medium in a server data processing system and wherein the program code may be downloaded over a network to a remote data processing system for use in a computer readable storage medium with the remote system.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that isolating faults causing slow downs or other performance problems in a network may be difficult due to the number of components and the number of types of different components that may be present. The different illustrative embodiments also recognize that the current processes and systems for isolating faults may be time consuming and expensive. As an example, attempting to identify whether a fault is occurring in software or hardware may require two or more groups looking at the same problem. Often times, one group will assume that the fault is with the other group's resources after performing a few diagnostics or tests.

The different illustrative embodiments provide a computer implemented method, apparatus, and computer usable program product for network fault isolation. In response to receiving a request for network fault isolation between a sender and a receiver, real-time path traces are performed between the sender and the receiver to form trace paths. A determination is made as to whether asymmetry is present between the sender and receiver from the trace paths. Also, a set of routers is identified for each trace path in the trace paths. Each event present for the identified routers are associated with those routers to form a set of identified events.

This type of information may be used for initial fault isolation to reduce or identify likely sources of the fault or cause of the network slow down. For example, the information developed from the different illustrative embodiments may be used to determine whether the potential fault is located within paths between the sender and receiver. If the fault is located in the path, then the fault may be due to hardware and/or software on components located between the sender and receiver. If the fault is not located within these paths used to send data between the sender and receiver, then the fault may be located in the software and/or hardware at the sender or receiver.

Figure 3:
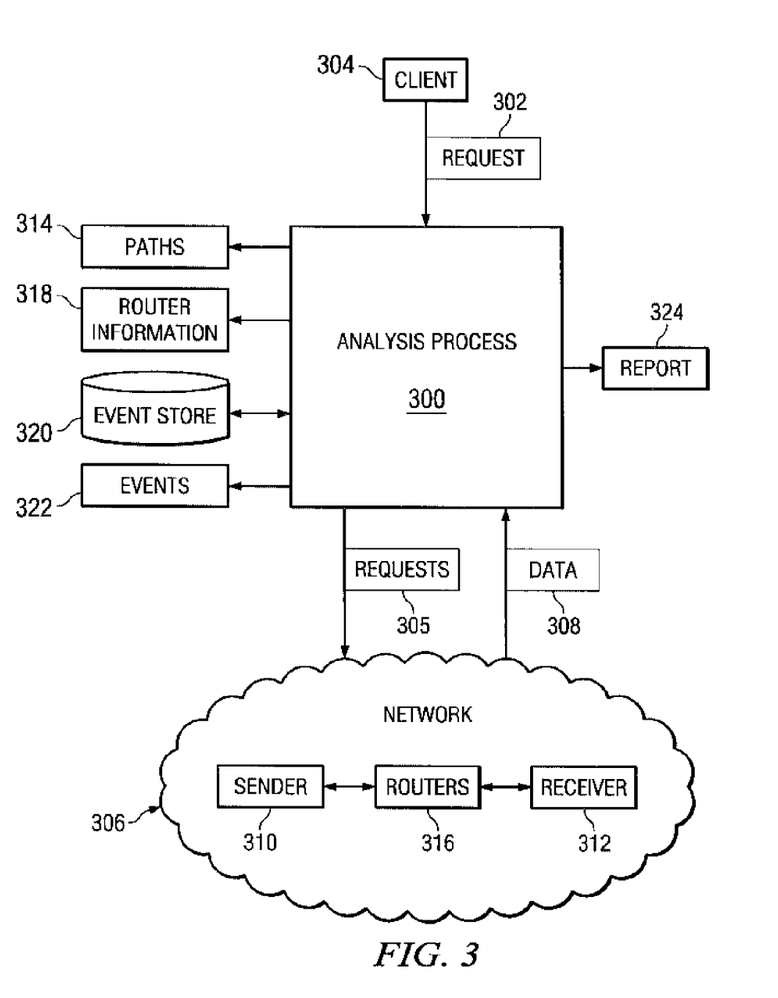
FIG. 3 is a diagram illustrating components used in network fault isolation in accordance with an illustrative embodiment.

With reference now to FIG. 3, a diagram illustrating components used in network fault isolation is depicted in accordance with an illustrative embodiment. In this example, analysis process 300 may be located on a data processing system, such as server 106 in FIG. 1. Analysis process 300 may be an application, program, process within another program or application used in network fault isolation. In particular, analysis process 300 may be used to collect information to determine whether a slow down in network service or data transfer is caused by software and/or hardware components along the path between two points through which data is sent.

Analysis process 300 may receive request 302 from client 304. Client 304 may be a process executing on a client computer, such as client 110 in FIG. 1. Request 302 may include an identification of a sender and receiver for which a degradation in service is believed to be present. Request 302 may include identification of the sender and receiver in various forms. For example, without limitation, the identification may take the form of uniform resource locators (URL's) and/or Internet protocol (IP) addresses.

Upon receiving request 302, analysis process 300 initiates or sends requests 305 into network 306 to obtain data 308. In these examples, network 306 may be a network, such as network 102 in FIG. 1, or a sub-network within network 102 in FIG. 1. Requests 305 may include commands to perform real-time path traces between sender 310 and receiver 312. These real-time path traces may be performed using various mechanisms, such as a trace route. A trace route is a computer network tool used to determine the route of path taken across an Internet protocol network.

This type of trace route tool is widely available in operating systems, such as UNIX® operating system, Linux® operating system, and Microsoft® Windows® operating system. UNIX® is a registered trademark of The Open Group, Linux® is a registered trademark of Linus Torvalds, and Microsoft® Windows® is a registered trademark of Microsoft Corporation.

These trace route commands may be sent to sender 310 and receiver 312. In other implementations, these commands may be sent to points approximate or close to sender 310 and receiver 312. The path traces between sender 310 and receiver 312 are returned in data 308, in these examples. The trace paths returned in data 308 are stored by analysis process 300 as paths 314. In addition, analysis process 300 may use the trace paths and identify routers, such as routers 316. The identification of routers 316 may be present in data 308 and are stored as router information 318.

With router information 318, analysis process 300 may query event store 320 to identify events 322. An event store is a collection of data, in these examples. An event store may be, for example, a database, which may be implemented using Tivoli® Enterprise Console®, which is available from International Business Machines Corporation. This product includes a feature in which events may be collected from devices, such as routers and stored in an event store for later analysis. Each event in events 322 identified from event store 320 is an events collected from routers identified in router information 318. These events may be used to identify whether problems or errors, such as link problems, are present.

As an example, analysis process 300 may filter events 322 to identify events that indicate link problems. With paths 314, router information 318, and events 322, analysis process 300 may generate report 324. This report may be sent back to client 304 or to some other user or group for further analysis in isolating the network fault involved in the degradation of services between sender 310 and receiver 312. In these examples, the report may contain an identification of network paths, as well as events 322. This report also may include, for example, trace route information, any variance in the trace routes, the average for the trace routes, the minimum and the maximum times, or any other suitable information that indicates whether a performance problem is present between those two points. The report also may include a list of all the events that occurred on all of the devices along that path. This type of information may be useful for the operator because the information provides an idea of what went wrong. The report may include utilization for the ports the path traversed, with utilization above 75 percent highlighted in red. Another example of information that may be in the report is parameters from each router along the path to indicate the overall health of the router. These parameters may include, for example, processor utilization, memory utilization, and temperature.

Figure 4:
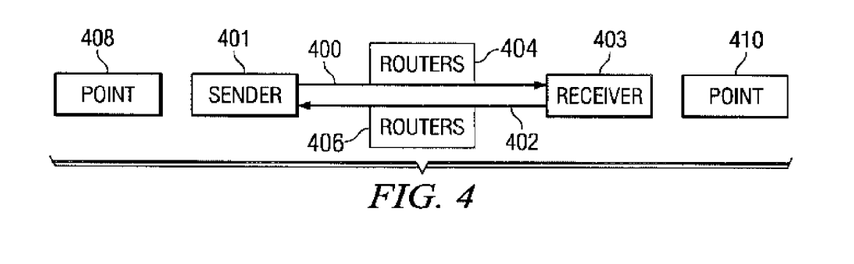
FIG. 4 is a diagram illustrating identifying real-time path traces in accordance with an illustrative embodiment.

Turning next to FIG. 4, a diagram illustrating identifying real-time path traces is depicted in accordance with an illustrative embodiment. In this example, real-time path traces are identified between sender 401 and receiver 403. In this illustrative example, path trace 400 and path trace 402 are identified between sender 401 and receiver 312. Path trace 400 starts at sender 401 and ends at receiver 403. Path trace 402 originates from receiver 403 and ends at sender 401. Path trace 400 and path trace 402 may be exactly the same path in different directions or may be different paths. In these examples, each path includes routers. For example, path 400 includes routers 404, and path 402 includes routers 406. Routers 404 and routers 406 may be the same, include subsets of each other, or may be entirely separate routers, depending on path 400 and path 402. Further, additional path traces may be generated between sender 401 and receiver 403. In the different illustrative examples, path traces may be generated between these two points every ten seconds for a period of time, such as one minute.

This type of generation of path data for paths may indicate whether "flapping" is present along a path. Flapping is a term used to indicate that packets may be sent and received out of order or may never reach destinations.

Further, the identification of paths may be performed using functions, such as a trace route or tracepath, which are commonly available on many operating systems. In these examples, the initiation of these types of functions may not occur on sender 401 and receiver 403. Instead, points close to or approximate to sender 401 and receiver 403 may be selected. In these examples, point 408 and point 410 are data processing systems or devices on which path trace functions are located. These points are used to generate paths between sender 401 and receiver 403. In some cases, the paths may not include sender 401 and receiver 408 because these points may be, for example, hosts on which the network management system may not be able to run path trace functions. In this case, with knowledge of the topology of the network, the shortest path between sender 401 and receiver 408 may be identified and the closest nodes or device on the path may be selected for running path trace functions.

Figure 5:
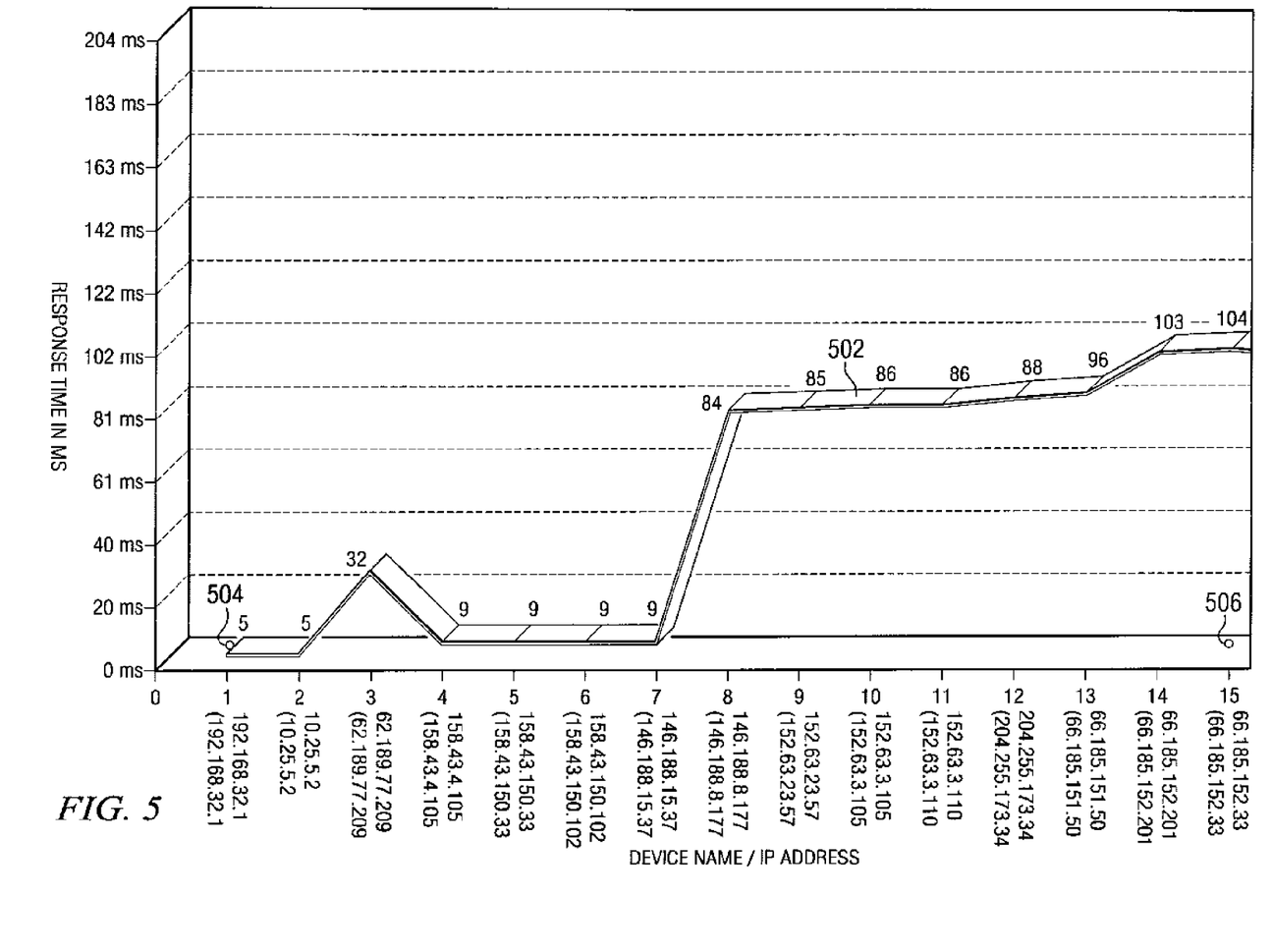
FIG. 5 is a diagram illustrating a real-time path trace in accordance with an illustrative embodiment.

Turning now to FIG. 5, a diagram illustrating a real-time path trace is depicted in accordance with an illustrative embodiment. In this example, diagram 500 illustrates a path trace obtained using a function, such as a trace route. Path 502 shows response times on the Y axis and nodes or devices on the X axis. These devices are routers through which data packets travel between end points 504 and 506. End points 504 and 506 may be end points, such as sender 401 and receiver 403, or point 408 and point 410 in FIG. 4. The identification of the different devices is used by the analysis process to obtain event information from those devices for use in fault analysis.

Figure 6:
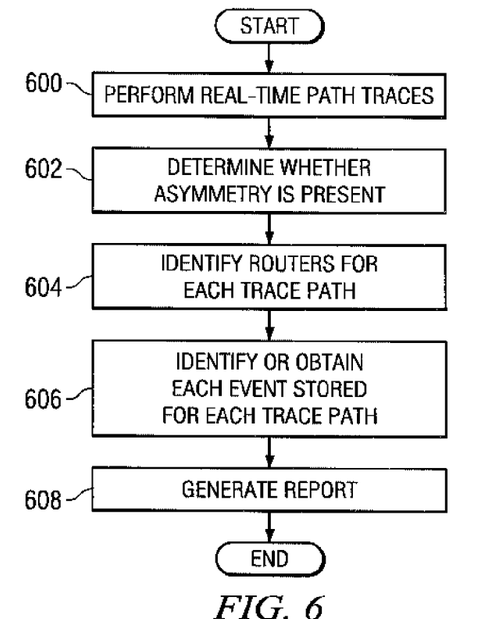
FIG. 6 is a flowchart of a process for network fault isolation in accordance with an illustrative embodiment.

Turning now to FIG. 6, a flowchart of a process for network fault isolation is depicted in accordance with an illustrative embodiment. The process illustrated in FIG. 6 may be implemented in a software component, such as analysis process 300 in FIG. 3.

The process begins by performing real-time path traces (step 600). In these examples, the real-time path traces may be performed by sending commands to the sender and receiver identified in the request, or to points approximate or close enough to the sender and receiver to identify routers used to send data between the sender and the receiver. Thereafter, the process determines whether an asymmetry is present in the real-time path traces between the sender and the receiver (step 602). In these examples, asymmetry is present if the path from the sender to the receiver is different from the path from the receiver to the sender. Routing decisions are made by routers at each hop based on the lowest cost interface that is closest to the destination. Most of the time, those decisions are the same from either side. However the traversed path from hop to hop may not be the same or "symmetrical".

Routers for each trace path collected are identified (step 604). Thereafter, each event stored for the identified routers is identified or obtained (step 606). The process then generates a report with the trace paths, identified routers, and/or events (step 608), with the process terminating thereafter.

Figure 7:
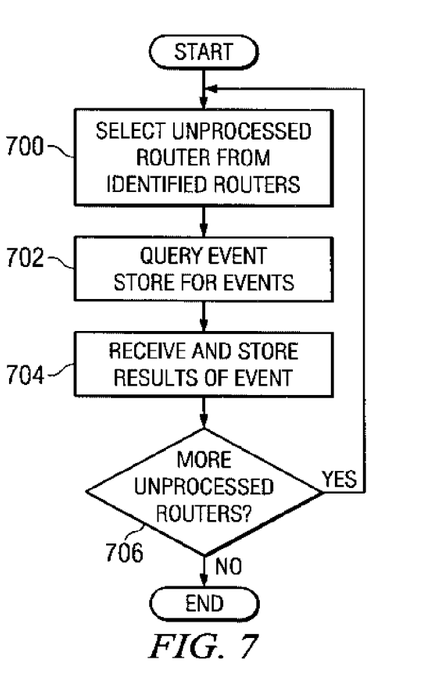
FIG. 7 is a flowchart of a process for identifying events in accordance with an illustrative embodiment.

With reference now to FIG. 7, a flowchart of a process for identifying events is depicted in accordance with an illustrative embodiment. The process illustrated in FIG. 7 is a more detailed description of step 606 in FIG. 6.

The process begins by selecting an unprocessed router from the identified routers (step 700). The process then queries an event store for events associated with the selected router (step 702). Thereafter, the process receives and stores the results of the query (step 704). A determination is then made as to whether additional unprocessed routers are present in the identified routers (step 706). If additional routers are present, the process returns to step 700. Otherwise, the process terminates. In these examples, the process illustrated in FIG. 7 also may include a filtering step or as part of the querying step in step 702 query for particular events that may indicate a link problem or some other problem that may contribute to the degradation and service.

Figure 8:
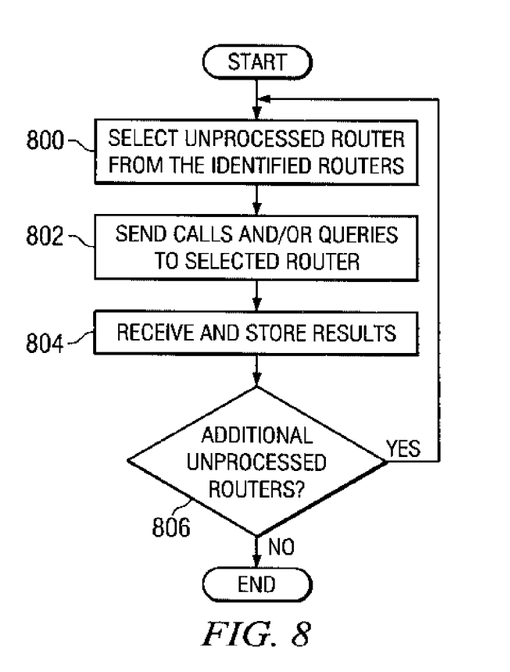
FIG. 8 is a flowchart of a process for identifying events and other information in accordance with an illustrative embodiment.

With reference now to FIG. 8, a flowchart of a process for identifying events and other information is depicted in accordance with an illustrative embodiment. The process illustrated in FIG. 8 is a more detailed illustration of another embodiment of step 606 in FIG. 6.

The process begins by selecting an unprocessed router from the identified routers (step 800). Next, the process sends calls and/or queries to the selected router (step 802). These calls and/or queries are sent to obtain data to determine whether the particular router may contribute to the degradation and service. Results are received and stored from the calls and/or queries (step 804).

A determination is then made as to whether additional unprocessed routers are present in the identified routers (step 806). If additional routers are present, the process returns to step 800. Otherwise, the process terminates. The particular calls and/or queries sent to the selected router may vary, depending on the particular implementation. These queries may be made, for example, against an event manager asking for all the events received from the router for the last 5 minutes. As another example, command line interface queries may be made against the router itself for the last 100 messages in its message log. The simple network management protocol may be used to obtain processor utilization, memory utilization, and temperature on the router. In step 802, the queries and calls may include requests for events from the router.

The analyses of events that may be performed may vary, depending on the particular events identified. For example, a link-down trap event and a configuration change trap event are examples of events that may be of interest in isolating network faults. In one example, the analysis process accesses the second router in the set. This device is a router that is being the originator of the link-down and configuration change trap.

A first rule dictates that the analysis process performs a simple network management protocol (SNMP) to verify that the device has the interface referred to by the trap and also checks the administrative status of the interface to ascertain whether or not the interface has changed administratively or operationally. If the result is that the interface has changed, the router has the interface and the interface has changed administratively.

This rule now triggers a subsequent rule that logs into the device via Secure Shell (SSH), enters super-user mode and retrieves configuration data from the router. When the current configuration data is retrieved from the device, an application programming interface (API) call is made the application that maintains configuration versioning for the most recent configuration data. The two configurations are differenced or compared by an external process which returns only the differences between the configurations.

A rule is triggered to create an authoritative event that updates the configuration versioning software, identifies the user who performed the configuration change, and has the configuration change difference in the event. For instance, the interface was administratively shut down because of a faulty port. This instance is recorded in the configuration files interface 'description' field. The operator is able to identify that the path change was the result of a configuration change and that a route between A and Z still exists.

In another example, a path has been retrieved between A and Z and the path has been resolved to a set of routers. The path is operational, but is severely degraded and a path degradation event has occurred. In this example, no device events of interest are present, but the path has been retrieved and is available as historical data. With this situation, the system utilizes the path degradation event to ascertain that the overall latency of the path is significantly larger than normal at the third hop. The third hop is resolved to a discovered router and interface.

The historical data store is referenced such that the latency at the hop of interest is cross-referenced with the nearest temporal match. The goal being to find the nearest historical time of day/day/week/month so that the current latency can be compared to what is normal for the current time. If the latency is not normal, a rule is triggered such that the application logs into the device via Secure Shell and enters super-user mode. A rule is triggered such that the analysis process knows to clear error counters on the interface previously identified. A rule is triggered such that the application performs a 'show interface' command and strips out the error rates associated with the interface.

The rule dictates that the command shall be run every minute and the delta between a previous error rate and new error rate registered. If the error rate is increasing, an authoritative event is created or updated such that operators are able to identify that the interface is subject to errors. If the error rate is not increasing, the frequency is reduced to a five-minute poll for thirty-minutes to ascertain whether or not the interface is subject to slower occurring errors. If it is, the event is created.

If after the frequency reduction the error rate is not increasing, the poll frequency is further reduced to one-hour for twelve-hours to ascertain whether or not long-term errors are occurring. These analyses of events have been provided as examples. These examples are not meant to limit what other analyses may be performed in other implementations.

Thus, the different illustrative embodiments provide a computer implemented method, apparatus, and computer usable program code for network fault isolation. Real-time path traces between a sender and receiver are performed in response to receiving a request for network fault isolation. The process also determines whether asymmetry is present between the sender and the receiver from the traces. A set of routers is identified for each trace path in the trace paths. The process identifies events stored for the identified routers. This information may be placed into a port for further analysis in network fault isolation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method performed by a data processing system for network fault isolation, the method comprising steps performed by the data processing system of:
responsive to receiving a request for the network fault isolation between a sender and a receiver, performing a plurality of real-time path tracing between the sender and the receiver to form a plurality of trace paths;
determining whether an asymmetry is present between the sender and the receiver from the plurality of trace paths;
identifying a set of routers included in each trace path in the plurality of trace paths to form a plurality of identified routers; and
identifying each event stored for the plurality of identified routers to form a set of identified events, wherein the each event is collected from the plurality of identified routers and stored in an event store maintained by the data processing system.

2. The method of claim 1, wherein the identifying step comprises:
examining the event store for every event from the plurality of identified routers to form the set of identified events associated with the plurality of identified routers, wherein a given router of the plurality of identified routers has multiple events associated with the given router that are stored in the event store.

3. The method of claim 1, wherein the identifying a set of routers step comprises:
querying the plurality of identified routers and storing results of the querying to form the event store, and wherein the performing the plurality of real-time path tracing between the sender and the receiver comprises sending trace requests to both the sender and the receiver that are identified in the request such that both the sender and the receiver are operable to perform the plurality of real-time path tracing using ones of the trace requests that are sent to the sender and the receiver, respectively.

4. The method of claim 3, wherein the performing step comprising:
performing the plurality of real-time path traces between the sender and the receiver to form the plurality of trace paths using a trace route tool, wherein the request includes an identification of the sender and the receiver.

5. The method of claim 1 wherein the event store comprises a plurality of events for each router of the plurality of identified routers, and further comprising:
filtering the set of identified events stored in the event store for link problem events.

6. The method of claim 1 further comprising:
associating ping times with the plurality of trace paths and the set of identified events in a report, wherein the step of performing the plurality of real-time path tracing between the sender and the receiver comprises sending a trace route command to both the sender and the receiver that are identified in the request.

7. The method of claim 1, further comprising:
a set of rules that specify a particular action to take based on a type of event in the set of identified events.

8. The method of claim 7, wherein the set of rules comprises a first rule that dictates an analysis process to verify that a given router associated with a given event in the set of identified events has an interface as specified by the given event.

9. The method of claim 8, wherein the set of rules comprises a subsequent rule that is triggered by the first rule, where the subsequent rule logs onto to the given router to obtain router configuration information from the given router.

10. A computer implemented method for network fault isolation, the computer implemented method comprising:
responsive to receiving a request for the network fault isolation between a sender and a receiver, performing a plurality of real-time path tracing between the sender and the receiver to form a plurality of trace paths;
determining whether an asymmetry is present between the sender and the receiver from the plurality of trace paths;
identifying a set of routers included in each trace path in the plurality of trace paths to form a plurality of identified routers;
identifying each event stored for the plurality of identified routers to form a set of identified events, wherein the each event is collected from the plurality of identified routers; and
creating a report containing the plurality of trace paths, the plurality of identified routers, and the set of identified events, wherein the report is used in the network fault isolation for the plurality of trace paths.

11. The computer implemented method of claim 10 further comprising:
analyzing the report to eliminate at least one of a network issue, an application issue, and a host issue in the network fault isolation.

12. A computer program product for network fault isolation, the computer program product comprising:
a tangible non-transitory computer recordable storage media;
program code, responsive to receiving a request for the network fault isolation between a sender and a receiver, for performing a plurality of real-time path tracing between the sender and the receiver to form a plurality of trace paths;
program code for determining whether an asymmetry is present between the sender and the receiver from the plurality of trace paths;
program code for identifying a set of routers included in each trace path in the plurality of trace paths to form a plurality of identified routers;
program code for identifying each event stored for the plurality of identified routers to form a set of identified events, wherein the each event is collected from the plurality of identified routers and stored in an event store; and
program code for filtering the set of identified events stored in the event store for link problem events, wherein the event store comprises a plurality of events for each router of the plurality of identified routers;
wherein the program code for performing, the program code for determining, the program code for identifying a set of routers, the program code for identifying each event, and the program code for filtering are stored on the tangible computer recordable storage media.

13. The computer program product of claim 12, wherein the program code for identifying each event stored for the plurality of identified routers to form the set of identified events comprises:
program code for examining the event store for every event from the plurality of identified routers to form the set of identified events associated with the plurality of identified routers.

14. The computer program product of claim 12, wherein the program code for identifying each event stored for the plurality of identified routers to form the set of identified events comprises:
program code for querying the plurality of identified routers and storing results of the querying to form the event store, and wherein the program code for performing the plurality of real-time path tracing between the sender and the receiver comprises program code for sending trace requests to both the sender and the receiver that are identified in the request such that both the sender and the receiver are operable to perform the plurality of real-time path tracing using ones of the trace requests that are sent to the sender and the receiver, respectively.

15. The computer program product of claim 12 further comprising:
a set of rules that specify a particular action to take based on a type of event in the set of identified events, wherein the set of rules comprises (i) a first rule that dictates an analysis process to verify that a given router associated with a given event in the set of identified events has an interface as specified by the given event, and (ii) a subsequent rule that is triggered by the first rule, where the subsequent rule logs onto to the given router to obtain router configuration information from the given router.

16. The computer program product of claim 12 further comprising:
program code for associating ping times with the plurality of trace paths and the set of identified events in a report, wherein the program code for performing the plurality of real-time path tracing between the sender and the receiver comprises program code for sending a trace route command to both the sender and the receiver that are identified in the request.

17. The computer program product of claim 12, wherein the program code are stored the computer recordable storage media in a data processing system and wherein the program code were downloaded over a network from a remote data processing system.

18. The computer program product of claim 12, wherein the program code are stored in the computer recordable storage media in a server data processing system and wherein the program code are downloaded over a network to a remote data processing system for use in another computer recordable medium with the remote data processing system.

19. A computer program product for network fault isolation, the computer program product comprising:
a non-transitory computer recordable storage media;
program code, responsive to receiving a request for the network fault isolation between a sender and a receiver, for performing a plurality of real-time path tracing between the sender and the receiver to form a plurality of trace paths;
program code for determining whether an asymmetry is present between the sender and the receiver from the plurality of trace paths;
program code for identifying a set of routers included in each trace path in the plurality of trace paths to form a plurality of identified routers;
program code for identifying each event stored for the plurality of identified routers to form a set of identified events, wherein the each event is collected from the plurality of identified routers; and
program code for creating a report containing the plurality of trace paths, the plurality of identified routers, and the set of identified events, wherein the report is used in the network fault isolation for the plurality of trace paths.

20. A data processing system comprising:
a bus;
a communications unit connected to the bus;
a storage device connected to the bus, wherein the storage device includes program code; and
a processor unit connected to the bus, wherein the processor unit executes the program code to perform a plurality of real-time path tracing between a sender and a receiver to form a plurality of trace paths in response to receiving a request for network fault isolation between the sender and the receiver, performing a plurality of real-time path traces between the sender and the receiver to form a plurality of trace paths; to determine whether an asymmetry is present between the sender and the receiver from the plurality of trace paths to identify a set of routers included in each trace path in the plurality of trace paths to form a plurality of identified routers; and to identify each event stored for the plurality of identified routers to form a set of identified events, wherein the each event is collected from the plurality of identified routers and stored in an event store maintained by the data processing system.

21. The data processing system of claim 20, wherein in executing the program code to identify each event stored for the plurality of identified routers to form the set of identified events, the processor unit executes the program code to examine the event store for every event from the plurality of identified routers to form the set of identified events associated with the plurality of identified routers, wherein a given router of the plurality of identified routers has multiple events associated with the given router that are stored in the event store.

22. The data processing system of claim 20, wherein in executing the program code to identify each event stored for the plurality of identified routers to form the set of identified events, the processor unit executes the program code to query the plurality of identified routers and store results of the query to form the event store, and wherein in executing the program code to perform the plurality of real-time path tracing between the sender and the receiver, the processor unit executes program code to send trace requests to both the sender and the receiver that are identified in the request such that both the sender and the receiver are operable to perform the plurality of real-time path tracing using ones of the trace requests that are sent to the sender and the receiver, respectively.

23. The data processing system of claim 20, wherein the event store comprises a plurality of events for each router of the plurality of identified routers, and wherein the processor unit further executes the program code to filter the set of identified events stored in the event store for link problem events.

24. A computer implemented method for network fault isolation, the computer implemented method comprising:
a set of rules that specify a particular action to take based on a type of event in a set of identified events, wherein the set of rules comprises a first rule that dictates an analysis process to verify that a given router associated with a given event in the set of identified events has an interface as specified by the given event;
responsive to receiving a request for the network fault isolation between a sender and a receiver, performing a plurality of real-time path tracing between the sender and the receiver to form a plurality of trace paths;
determining whether an asymmetry is present between the sender and the receiver from the plurality of trace paths;
identifying a set of routers with each trace path in the plurality of trace paths to form a plurality of identified routers; and
identifying each event stored for the plurality of identified routers to form a set of identified events, wherein the first rule also checks administrative status of the interface to ascertain whether the interface has changed either administratively or operationally.

* * * * *